July 22, 1924.
J. A. WRIGHT
1,502,366
DIE PLATE FOR DENTAL BRIDGEWORK
Filed Feb. 9, 1922
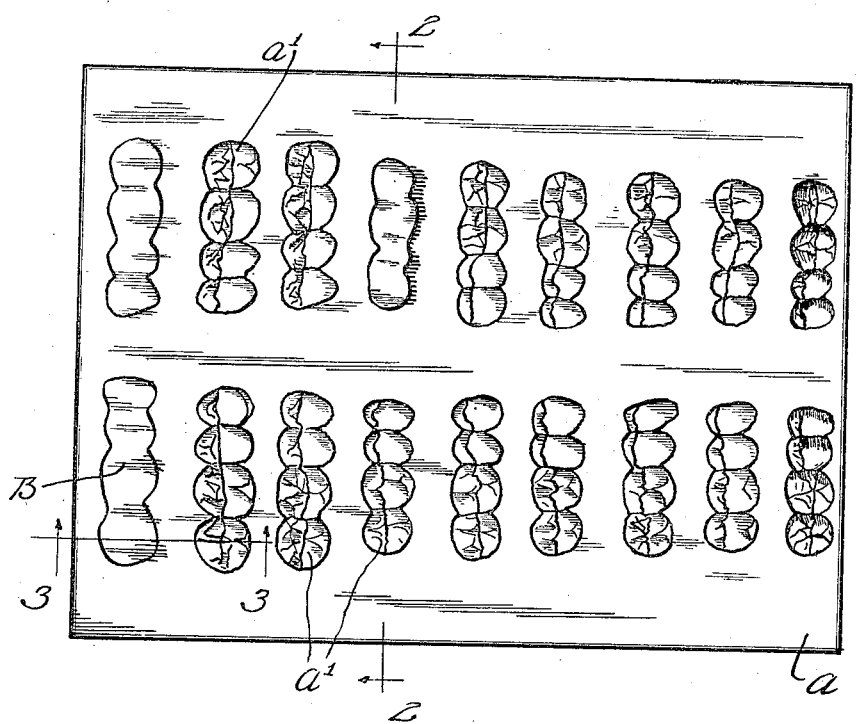
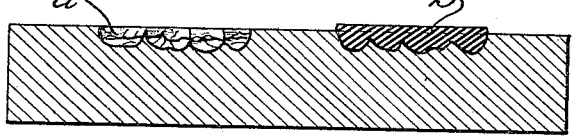
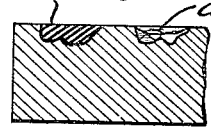
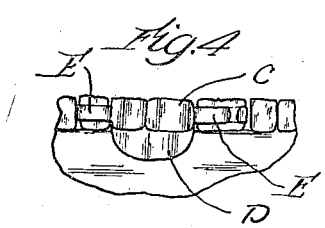
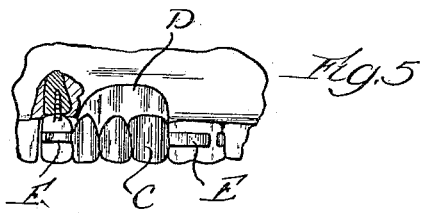
Inventor
James A. Wright
By Parker & Carter
Attys.

Patented July 22, 1924.

1,502,366

UNITED STATES PATENT OFFICE.

JAMES A. WRIGHT, OF CHICAGO, ILLINOIS.

DIE PLATE FOR DENTAL BRIDGEWORK.

Application filed February 9, 1922. Serial No. 535,185.

*To all whom it may concern:*

Be it known that I, JAMES A. WRIGHT, a citizen of the United States, residing at Chicago, in the county of Cook and State of Illinois, have invented a certain new and useful Improvement in Die Plates for Dental Bridgework, of which the following is a specification.

My invention relates to a die plate for dental bridge work, and has for objects to provide a universal die plate from which dummies for cast bridge work may be easily and quickly made for any desired tooth or combination of teeth. Another object is to provide a die plate from which such dummies may be made for any size of tooth. Another object is the provision of a process of bridge work which shall be quicker and cheaper and more efficient than the processes prevailingly used, and particularly which shall enable solid cast bridgework to be made and to be readily attached to any suitable attaching means at the end of the bridge, whereby the bridge may be secured to adjacent teeth. Other objects will appear from time to time in the course of the specification.

I illustrate my invention more or less diagrammatically in the accompanying drawings, wherein—

Fig. 1 is a view of the die plate;

Fig. 2 is a section on the line 2—2 of Fig. 1;

Fig. 3 is a section on the line 3—3 of Fig. 1;

Fig. 4 is a view of a dummy or mold in place in the jaw model;

Fig. 5 is a similar view of a different type of dummy.

Like parts are indicated by like characters throughout the drawings.

A is a die plate having along each side thereof a plurality of standard-shaped tooth cavities or impressions $A^1$ $A^1$. As seen from left to right in the figure, these cavities are of decreasing size, those to the left being for teeth of the largest size and those at the right for teeth of the smallest size normally used. The column along the top of the figure represents the teeth at the right side of the jaw, and the column at the bottom the teeth at the left side, and each opposed pair, across the columns, furnishing a standard impression of the teeth of both sides of the jaw, omitting, of course, the single teeth of the front of the jaw. One plate is provided for the upper jaw and one for the lower, and the plates are, of course, appropriately marked to indicate this fact and to indicate which molds are for the right and which for the left side of each jaw, respectively. The wax blank is illustrated at B in Figs. 1, 2 and 3.

The plates may be made of any suitable material, for example of metal, and any suitable molding material or wax may be used with them.

The process of use is as follows: The wax is properly softened or heated and then pressed into the mold. The height of the tooth may be varied somewhat by permitting the wax to project above the plate, as shown in Fig. 2, whereas a tooth of minimum depth is obtained by a flush fit of the wax, as in Fig. 3.

The dentist using the plate has, of course, a cast of the jaw of the patient, showing the size and shape of the gap to be bridged and the exact form of the gum and the adjacent sound teeth. He picks out on his die plate the appropriate teeth to fill the gap, and then has a selection, for particular teeth, or eight or nine different sizes. Picking out the right size, he fills the die with the heated or otherwise softened wax and kneads it down in to take the impression. If only one tooth is needed, he forces the wax into that tooth in the die and then, when he has lifted out the wax impression, he shapes down the wax at the sides of that tooth and fits it into the cavity in the jaw form above mentioned. If two teeth are needed, he makes a corresponding longer die, and the length of the bridge is limited simply by the number of teeth missing and the length of the gap to be bridged. When the wax impression has been taken, it is waxed into shape on the jaw form and, if desired, it may then be cast directly by any of the suitable casting and metal-pouring processes, which need not be described herein.

Fig. 4 illustrates a wax dummy C in place in the jaw form. If the dentist desires a gold saddle about the base of the teeth and projecting out over the gums, he simply adds wax to the dummy as shown at D in Fig. 1, to make the saddle form, although the saddle may, if desired, be separately cast or swedged and then soldered to the finished bridge. When the dummy is properly positioned and shaped—and of course the dentist does this by manipulation and even by cutting and kneading projecting bits of wax,—then he can, if he wishes, secure to the dummy the bands or crowns or other means for securing the bridge to the adjacent teeth. Such bands are shown in Fig. 4 as E E. The entire dummy may then be removed and cast and the bands will be integral with the completed bridge and saddle. The completed bridge is then put in place by the dentist in the usual manner, the bands secured to the adjacent teeth. This method obviously permits great variations in detail and, if desired, the securing means may be soldered to the bridge casting after its completion, or instead of bands a cap or crown or tooth top may be similarly waxed to the dummy and thus made integral with the finished casting. Such tooth or crown is then fastened to the adjacent tooth or root in any desired manner.

If enamel tops or faces are desired, the wax form or dummy may be made in the same way and the front may then be cut down or otherwise recessed to leave room for the subsequent enamel face, which may be cemented thereto after the casting process.

The advantages of my die plate and of my novel process of bridge work are obvious. As to the die plate, it furnishes a die for every tooth which is normally replaced by gold bridge work, but, of course, the die plate may be enlarged and provided with an impression of every tooth, if desired, although I prefer to omit the single teeth. The impressions may be taken from these dies of one tooth or of any combination of teeth, and for each individual tooth or combination of teeth a choice of a large number of sizes is provided. In other words, the dentist has available a standard die for every tooth and for a wide variation in tooth size.

This plate lends itself particularly to the process above described, but it might also be used to swedge gold teeth, by the application of thin metal to the die and the usual working to form of such metal, and subsequently filling the shell thus formed with some suitable metal.

It has long been the practice in bridge work to swedge the teeth and build them up compositely, swedging the crown from thin gold and soldering the front and back to it by a rather complicated process, which need not here be described. Among the obvious disadvantages are the fact that the finished tooth is thin, that it has weakening soldered joints, that its destruction is risked during the soldering, and that the securing means must be added to it by a separate operation, after the bridge itself is completed. The finished product is of thin metal and, in the course of grinding down to fit, or of polishing, it is further thinned and weakened, and possibly destroyed.

The process herein described has many advantages over the complicated and defective earlier practice. In the first place, the operator has ready to hand a standardized mold. With this mold he makes a wax impression or dummy, and this dummy he applies to the form of the jaw, where he can quickly and easily form it to final shape. He can form integral with the dummy of the teeth the saddle or other protection which goes over the gum, and he can secure directly to the wax dummy the fastening means which are to be permanently secured to the finished bridge. This dummy, with the attached securing means, is then cast, and with very slight polishing and fitting is ready for application to the mouth of the patient.

While I have described a working process and a practical device, it is obvious that both may be widely varied without departing from the spirit of my invention.

I claim:

As a new article of manufacture, a die for dental work comprising a die plate, the upper surface of which is formed into a plurality of apertures, said apertures each conforming to the shape of a plurality of adjacent molars positioned substantially as in the human jaw, the die plate being formed with a plurality of such apertures graduated as to size, said apertures being aligned along said plate, the impressions of the teeth on one side of the jaw being aligned along one side of the plate and those of the other side of the jaw being aligned along the other side of the plate.

Signed at Chicago, county of Cook and State of Illinois, this 7th day of February 1922.

JAMES A. WRIGHT.